United States Patent [19]

Silverstein

[11] 4,103,805
[45] Aug. 1, 1978

[54] CONTAINER

[75] Inventor: Sidney Silverstein, Flushing, N.Y.

[73] Assignee: Pearl-Wick Corporation, Long Island City, N.Y.

[21] Appl. No.: 853,139

[22] Filed: Nov. 21, 1977

[51] Int. Cl.² ................. B65D 43/20; B65D 85/56
[52] U.S. Cl. ............................ 220/331; 312/328; 312/292
[58] Field of Search ............... 220/331, 329; 217/59; 312/292, 300, 328

[56] References Cited

U.S. PATENT DOCUMENTS

| | | | |
|---|---|---|---|
| 1,556,353 | 10/1925 | Roedding | 312/300 X |
| 2,399,470 | 4/1946 | Crane | 220/331 X |
| 2,731,319 | 1/1956 | Jacobs et al. | 312/328 X |
| 2,732,274 | 1/1956 | Cotton | 312/328 X |
| 2,784,047 | 3/1957 | Wallace | 312/328 |
| 2,801,737 | 8/1957 | Derman | 312/328 UX |
| 2,804,986 | 9/1957 | Jeffers et al. | 220/331 |
| 3,193,339 | 7/1965 | Cooper | 312/42 |
| 3,241,901 | 3/1966 | Waybright | 312/328 X |
| 4,048,050 | 9/1977 | Hillman | 220/331 |

Primary Examiner—Davis T. Moorhead
Attorney, Agent, or Firm—Henry R. Lerner

[57] ABSTRACT

A container having a housing and a closure comprising a panel having compartment defining means, the closure being pivotally movable between container opening and closing positions. The container and closure are releasably securable to each other. The bottom wall of the housing is provided with an upstanding lip member and the bottom wall of the compartment has its forwardmost edge in parallel spaced relation with the bottom edge of the panel to define a slot between the panel and bottom wall of the compartment. The closure is assembled onto the housing with the lip inserted in the slot whereby the bottom wall of the compartment is supported by the juncture of the lip and bottom wall of the housing to enable pivotal movement of the closure relative to the housing without requiring pins or hinges. The normal weight of the closure biases the closure into closing position after the closure has been manually pivoted into said closing position. The container is particularly well suited to function as a bread box.

7 Claims, 10 Drawing Figures

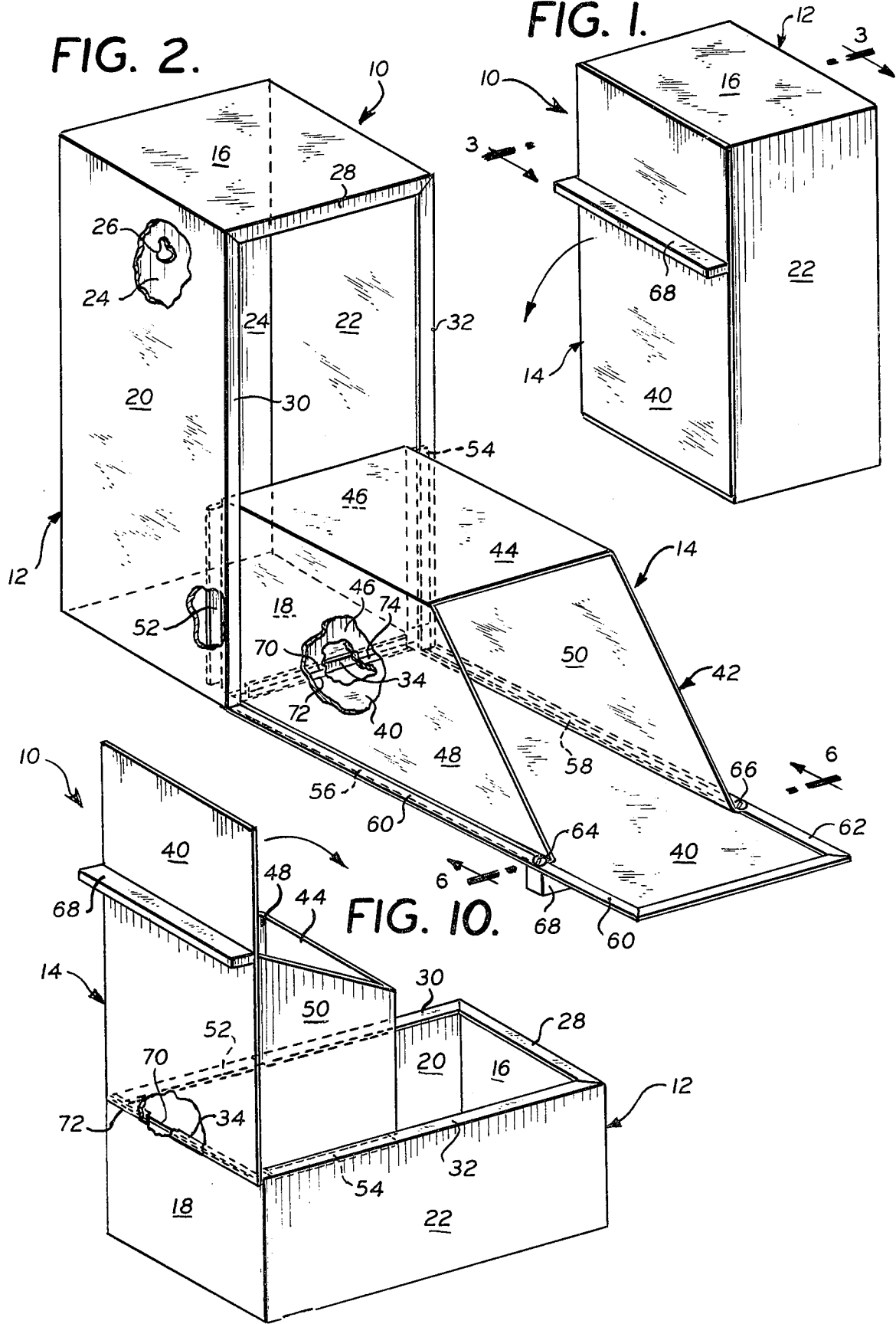

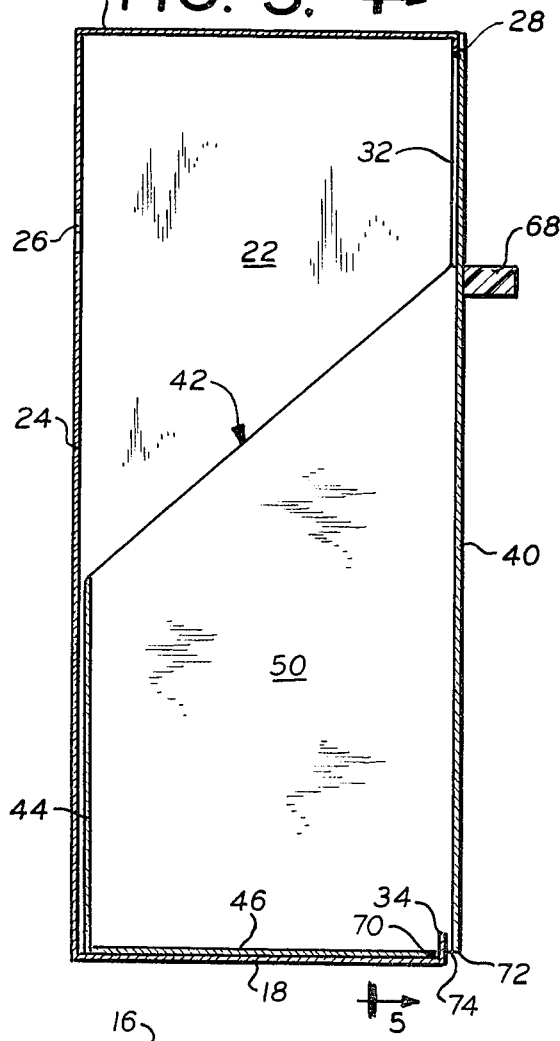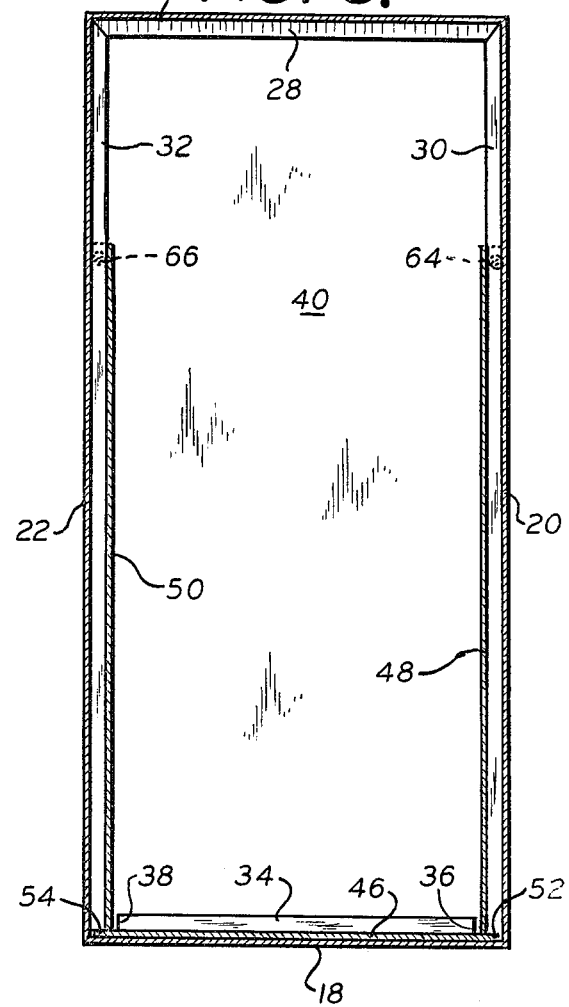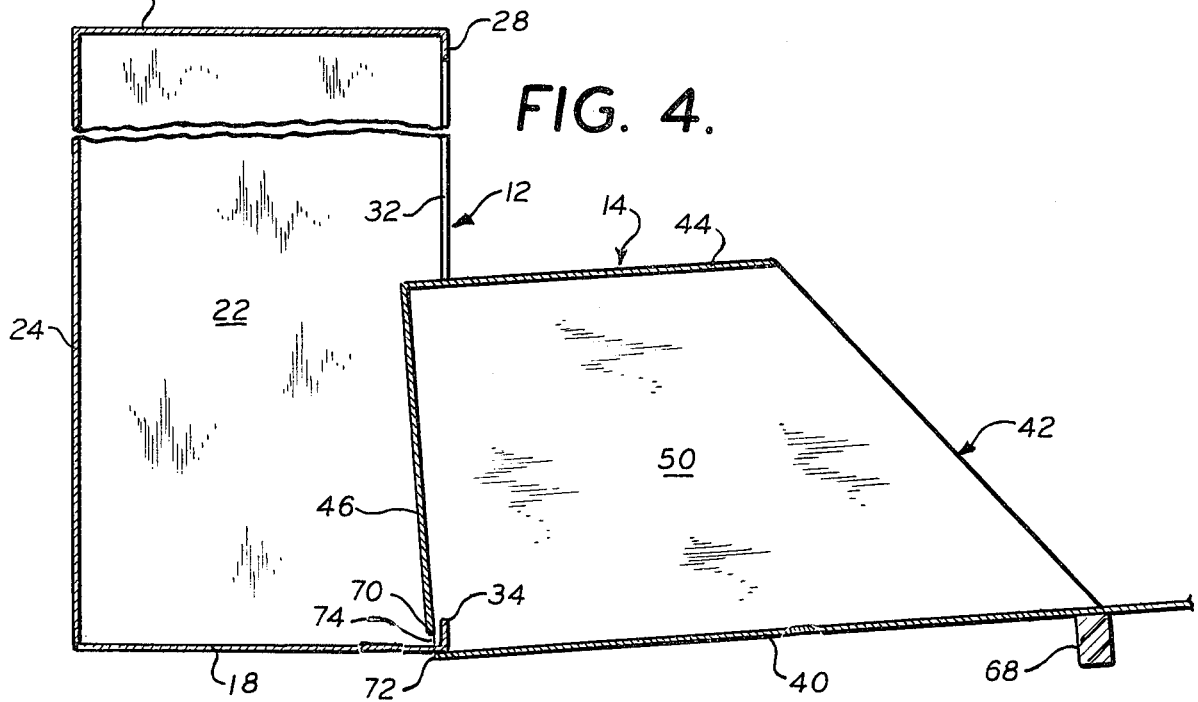

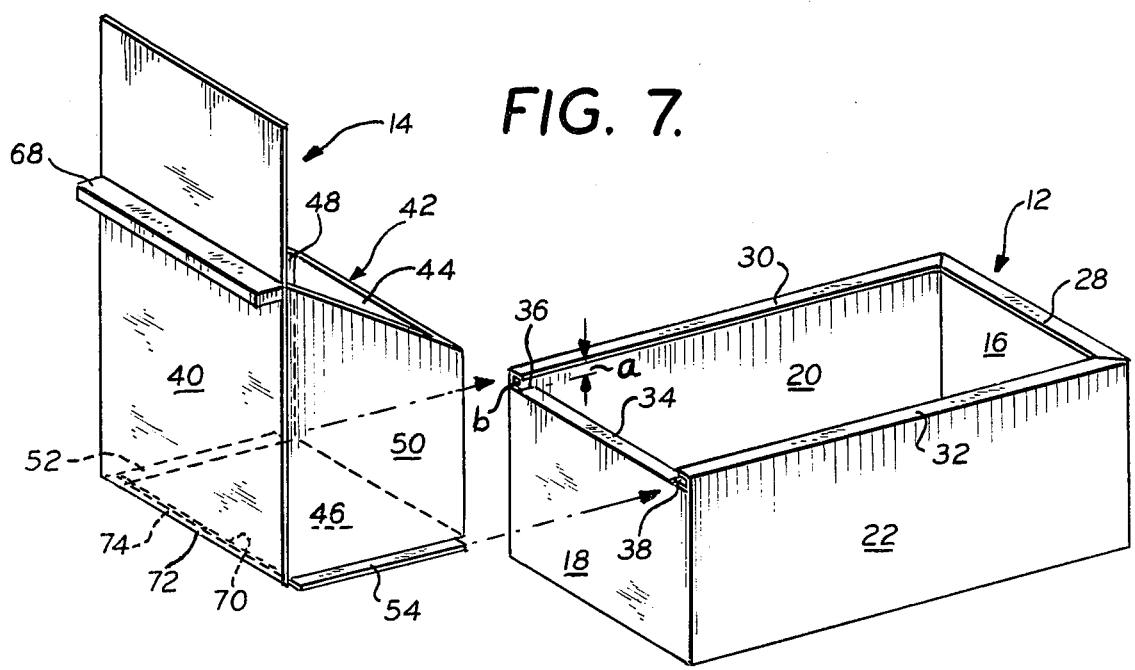
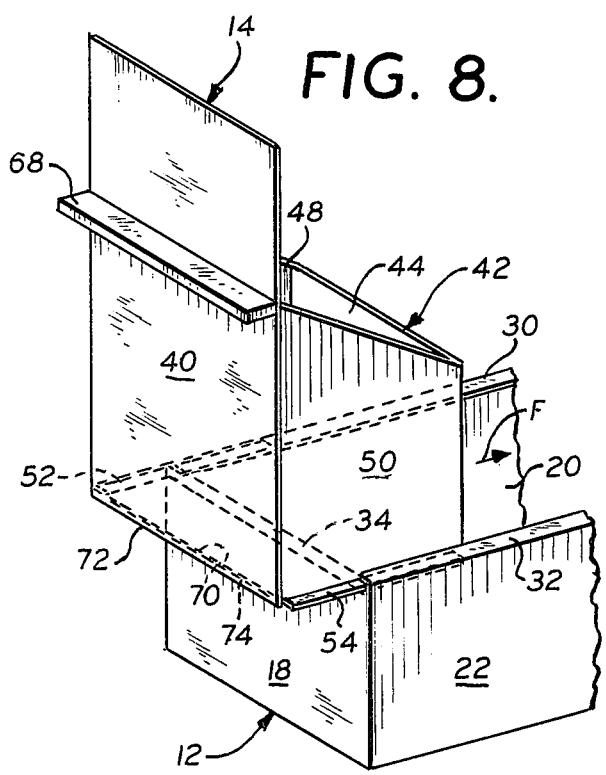
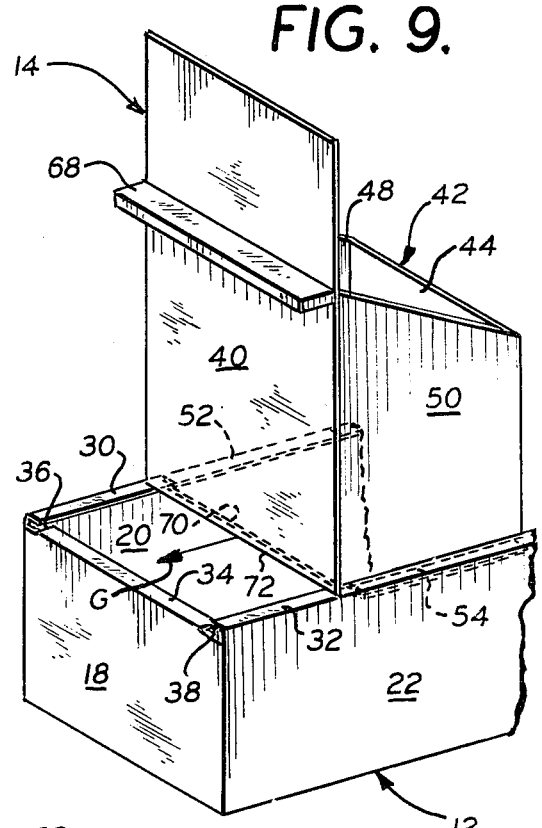
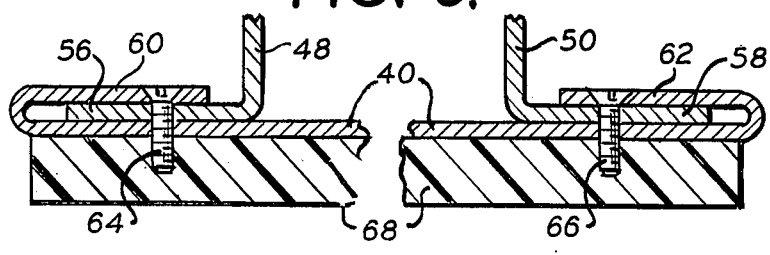

CONTAINER

BACKGROUND OF THE INVENTION

The present invention relates to a container of the type wherein there is provided a closure which is adapted to be pivotably mounted with respect to the container housing for movement between a closed position thereof and an open position thereof. The container is particularly adaptable for use as a bread box but could clearly be used for housing articles other than bread, as may be desired.

The use of containers having pivotally mounted closures is, as such, well known in the art. Such containers, however, utilize conventional means for such pivotal mounting consisting usually of conventional hinges or pins adapted to be received in complementary openings or bearings therefor.

The difficulty with such prior art containers having pivotally mounted closures is that the use of hinges and pins renders the construction somewhat more complex and expensive and makes it necessary for the closure to be fully assembled at the point of manufacture and prior to shipping, there being no possibility of severing the closure from the housing without impairing the further utility of the pivoting means whether such consists of hinges or pins. Further, in accordance with the prior art, it is usually necessary to provide auxiliary means for maintaining the container closed, such auxiliary means comprising components such as springs or magnets, all of which add to the cost of the unit and all of which present other possible sources for malfunction.

It is therefore an object of the invention to provide an improved container which is void of the above mentioned disadvantages now present in prior art containers, particularly of the type which function as bread boxes.

SUMMARY OF THE INVENTION

In accordance with the invention, there is provided a container, particularly adapted to function as a bread box, consisting of only two separate components which are releasably securable one to the other in a manner which permits pivotal movement of the closure between an open position thereof in which the contents of the container are readily accessible, and a closed position thereof in which such contents are safely insulated from external effects.

One of the components comprises an open rectangular housing having a back wall, a top and bottom wall, and two side walls thereby leaving a front opening into the housing. The other component comprises a rectangular panel to the inner side of which there is secured means defining a compartment for the contents of the container. The bottom wall of the housing is provided with an upstanding lip member and the bottom wall of the compartment defining means has its forwardmost edge in parallel spaced relation with the bottom edge of the rectangular panel, thus defining a slot between the panel and the bottom wall of the compartment. This construction enables said forwardmost edge of the bottom wall of the compartment defining means to be supported by the juncture of the bottom wall and lip on the housing in a manner which enables the closure member to be pivotally movable with respect to the housing. Furthermore, cooperating complementary flanges are provided on the compartment defining means and the housing to limit the extent to which the closure member can be pivoted with respect to the housing to a 90° angle so that in the normally open position of the container, the closure member is horizontal when the housing is suspended in a vertical position, permitting ready access to the contents of the container. In accordance with such construction, the bottom wall of the compartment defining means can be guided forwardly of the lip on the housing to enable total withdrawal of the closure member from the housing. To assemble the closure member onto the housing, the bottom wall of the compartment defining means is passed forwardly of the lip and when it clears the lip is moved into position rearwardly of the lip to permit the pivotal engagement referred to above.

The location of the compartment defining means with respect to the pivoting access is such that when the closure is pivoted into closing position, the torque exerted by the closure and its contents with respect to the pivoting access insures closing engagement of the closure with respect to the housing which is maintained until the closure is manually opened when so intended.

BRIEF DESCRIPTION OF THE DRAWINGS

FIG. 1 is an elevational perspective view of the container, in accordance with the invention, shown in closed position;

FIG. 2 is an elevational perspective view thereof, on an enlarged scale, showing the container in open position;

FIG. 3 is a vertical section taken along lines 3—3 of FIG. 1, shown on an enlarged scale;

FIG. 4 is a view similar to FIG. 3 but showing the closure pivoted into an opening position thereof;

FIG. 5 is a sectional view on lines 5—5 of FIG. 3;

FIG. 6 is a section along lines 6—6 of FIG. 2, on an enlarged scale;

FIG. 7 is a perspective view of the housing and closure member, spaced from each other, preparatory to the insertion of the closure member into the housing for assembly thereof; and FIGS. 8, 9 and 10 are views similar to FIG. 7, showing the various stages for assembling the closure member onto the housing.

DESCRIPTION OF THE PREFERRED EMBODIMENT

Referring now to FIG. 1, there is shown the container 10 in accordance with the invention in closed position consisting of solely two components, namely, housing 12 and closure member 14. As best shown in FIG. 2 which illustrates the container 10 in its open position, housing 12 is of box-like configuration comprising top wall 16, bottom wall 18, side walls 20 and 22, and rear wall 24, there being no front wall whereby to provide the access opening into housing member 12. Rear wall 24 may be provided with a bayonet slot 26 for suspending container 10 in its normal vertical disposition as shown in FIG. 2.

As best shown in FIGS. 7 and 2, top wall 16 and side walls 20 and 22 are provided with inwardly turned flanges 28, 30 and 32, respectively, which are coplanar, and extend perpendicularly to the respective walls from which they emanate, which flanges so to speak frame the opening into housing 12. Bottom wall 18 is also provided with an upwardly turned lip 34 positioned in a plane parallel to the vertical plane containing flanges 28, 30 and 32 but inwardly spaced therefrom to define a clearance $a$ therebetween. Furthermore, lip 34 is shorter in length than the distance between walls 20 and 22 to define clearances *b* between the side edges 36 and 38 of said lip and their confronting side walls 20 and 22, respectively, all for reasons to be more fully discussed hereafter.

Housing member 12 is preferably made of two pieces of sheet metal, cut and bent into shape, one of which defines the two side walls, the top wall, and the associated flanges, and the other one of which defines the rear wall, the bottom wall, and upstanding lip 34, with the two pieces being suitably spot welded to define a unitary housing structure.

As best shown in FIGS. 2 and 7, closure member 14 comprises a rectangular panel 40 to which there is secured compartment member 42 defined, in the orientation of FIG. 2, by top wall 4, end wall 46, and forwardly slanted side walls 48 and 50 defining therebetween the opening for the compartment. As shown, the spacing between opposite side walls 48 and 50 is slightly less than the width of the opening to housing 12, defined by the distance between flanges 30 and 32, so that compartment 42 is insertable within the housing through the opening thereof. On the other hand, the width of panel 40 is substantially equal to the distance between opposing side walls 20 and 22 of the housing so that when the unit is in the closed position as shown in FIG. 1, the contour of panel 40 is in substantial juxtaposition with the confronting contour of the housing to define a neat assembly. As best shown in FIGS. 2, 5 and 7, end wall 46 is provided with flanges 52 and 54, as continuations thereof extending beyond side walls 48 and 50, respectively.

Compartment member 42 is secured to panel 40 in any suitable manner as for example, and as shown in FIG. 6, by providing side walls 48 and 50 with outwardly turned flanges 56 and 58 held respectively within doubled over borders 60 and 62 of panel member 40. Flanges 56 and 58 may be fastened to panel 40 by means of screws 64 and 66 which also secure to the panel a handle 68. In addition, flanges 56 and border 60 may be spot welded at spaced intervals. Rear edge 70 of end wall 46 is laterally and vertically spaced from bottom edge 72 of panel 40 to define a slot 74 therebetween.

The assembly and operation of the container will now be described with particular reference to FIGS. 7, 8 and 9. As shown in FIG. 7, the closure member 14 is aligned with housing member 12 so that flanges 52 and 54 are adapted to be inserted in the clearance *b* between lip 34 and flanges 30 and 32 of the housing. The closure member 14 is then so inserted within housing 12 as shown in FIG. 8 (by moving it in the direction shown by the arrow F) until the entire closure member clears lip 34. Thereafter, as shown in FIG. 9, the closure member is moved in the opposite direction (as shown by the arrow G) with edge 72 of panel 40 sliding on flanges 30 and 32 to now permit end wall 46 to pass below lip 34 which penetrates slot 74, resulting in edge 70 of end wall 46 in engagement with the inner junction of lip 34 and bottom wall 18 of the housing, as shown in FIG. 10. The unit is now assembled and when placed into its normal position as shown in FIGS. 1 and 3, can easily be closed, with edge 70 of end wall 46 resting against lip 34 of the housing, and with panel 40 in surface to surface engagement with flanges 28, 30 and 32. To open the unit, the handle is moved outwardly permitting closure member to pivot as shown in FIG. 4 with end edge 70 of the closure member being pivotable within the junction of lip 34 and bottom wall 18. In this connection, it will be noted, as best shown in FIG. 2, that flanges 30 and 32 of the housing will be engaged by flanges 52 and 54 of the closure member to limit pivotal movement of the latter to a maximum of 90° in which the panel 40 is horizontal and access to compartment 42 is readily available for insertion or removal of the contents thereof which, if the container is used as a bread box, would be a loaf of bread.

It will also be noted that when the closure is manually pivoted into a closing position, there is reached a point where the weight of the compartment with or without the weight of any contents therein will define a torque to automatically force the closure to assume its closed position and maintain such closed position until such time as an affirmative manual outward pull is applied to the handle of the closure member.

Thus, it is seen that the container in accordance with the invention is made of two simple separable components which are easily assembled to define a closure pivotally movable with respect to the container housing between open and closed positions thereof, without requiring the use of hinges, pins, springs and other components usually associated with pivotally mounted closures intended to normally remain in a closed position. It will be evident that such construction is most economical in construction, most effective for its intended purpose and substantially free of malfunction and wear and tear normally associated with containers of this type.

It will also be apparent that due to this highly novel and ingenious construction, there results a flexible arrangement which permits interchangeability of closures as may be desired for aesthetic or any other purpose. It will further be apparent that the container in accordance with the invention can easily be mounted on a wall in its normal vertical disposition by engagement of bayonet slot 36 with an appropriate hook or nail or that the container may simply be placed on a shelf in which case it will rest on bottom wall 18 of the housing. As previously stated, the container as aforedescribed is particularly suitable as a bread box with the bread to be housed within compartment 42, although it will be understood that such container has equal application to contain articles other than bread.

While there is herein shown and described the preferred embodiment of the invention, it will be understood that the invention may be embodied otherwise than as herein specifically illustrated or described, and that in the illustrated embodiment certain changes in the details of construction and in the form and arrangement of parts may be made without departing from the underlying idea or principles of this invention within the scope of the appended claims.

Having thus described my invention, what I claim and desire to secure by letters patent is:

1. A container comprising,
   (a) a housing having a top wall, a bottom wall, a rear wall, a pair of side walls and a front opening,
   (b) a closure comprising a panel having compartment defining means secured thereto, at the inner side thereof,
   (c) cooperating means on said housing and closure for releasably securing said closure to said housing and for permitting said closure to pivotally move with respect to said housing from an opening position thereof in which there is access to said compartment defining means to a closing position thereof in which said panel covers said housing front opening and said compartment defining means is disposed inwardly of said housing, (d) said compartment defining means comprising a pair of side walls extending from opposite sides of said panel, a top wall and an end wall extending between said side walls, and a front opening opposite said end wall, the bottom edge of said end wall being spaced from the bottom edge of the panel to define a slot therebetween, and (e) said cooperating means comprising a lip extending upwardly of the front edge of said housing and adapted to be inserted in said slot so as to seat the bottom edge of the end wall within the juncture of the lip and housing whereby said closure is pivotally movable with respect to the housing.

2. A container in accordance with claim 1, wherein said housing top wall and side walls are provided with inwardly turned coplanar flanges forwardly of said lip, and wherein said compartment end wall is provided with coplanar side flanges extending beyond said compartment side walls, whereby said side flanges are insertable between said inwardly turned flanges and said lip until they clear said lip after which the bottom edge may be received within said juncture for permitting said pivotal movement of said closure relative to the housing.

3. A container in accordance with claim 2, wherein said inwardly turned coplanar flanges define stop means for limiting the outward pivotal movement of said closure relative to said housing.

4. A container in accordance with claim 2, wherein the weight of said compartment produces a torque for maintaining said closure in said closed position after said closure has been pivoted to said closing position thereof.

5. A container in accordance with claim 4, wherein said inwardly turned coplanar flanges define stop means for limiting the outward pivotal movement of said closure relative to said housing.

6. A container in accordance with claim 1, wherein there is provided a handle at the outer side of said panel for manually moving said closure between said opening and closing positions thereof, said handle being secured to said panel by fastening means which also secure said compartment side walls to said panel.

7. A container in accordance with claim 1, wherein said container is a bread box and said compartment defining means is dimensioned so as to receive a conventional loaf of bread.

* * * * *